United States Patent [19]

Graff et al.

[11] 3,958,933

[45] May 25, 1976

[54] PROCESS FOR THE MANUFACTURE OF FAST DYEINGS ON SYNTHETIC HYDROPHOBIC TEXTILE MATERIAL

[75] Inventors: Gustaf Graff, Hillside, Ill.; Hans-Jörg Angliker; Richard Peter, both of Basel, Switzerland; Branimir Milicevic, Rhine, Switzerland; Hansruedi Hoster, Dornach, Switzerland; Raymond Dèfago, Rhine, Switzerland

[73] Assignee: Ciba-Geigy Corporation, Ardsley, N.Y.

[22] Filed: May 13, 1974

[21] Appl. No.: 468,968

Related U.S. Application Data

[63] Continuation of Ser. No. 380,311, July 18, 1973, abandoned, which is a continuation of Ser. No. 170,951, Aug. 11, 1971, abandoned.

[30] Foreign Application Priority Data

Aug. 13, 1970   Switzerland..................... 12151/70

[52] U.S. Cl. ...................................... 8/165; 8/41 B; 8/41 C; 8/74; 8/178 R; 8/179; 8/DIG. 11
[51] Int. Cl.² .......................................... D06P 5/02
[58] Field of Search .................. 8/165, 74, 165, 74, 8/DIG. 11

[56] References Cited
UNITED STATES PATENTS

| | | | |
|---|---|---|---|
| 3,066,005 | 11/1962 | Wedemeyer............................ | 8/17 |
| 3,078,138 | 2/1963 | Miller et al. ......................... | 8/128 A |
| 3,232,692 | 2/1966 | Wilhelm............................ | 8/120 XX |
| 3,265,461 | 8/1966 | Luetzel .................................... | 8/84 |
| 3,537,808 | 11/1960 | Gardon.................................. | 8/128 X |
| 3,782,896 | 1/1974 | Defago et al. ......................... | 8/2.5 |

FOREIGN PATENTS OR APPLICATIONS

| | | |
|---|---|---|
| 1,277,887 | 10/1961 | France |
| 1,079,766 | 12/1954 | France |
| 1,250,832 | 12/1960 | France |
| 942,507 | 4/1956 | Germany |
| 1,078,894 | 8/1967 | United Kingdom |
| 729,656 | 5/1955 | United Kingdom |
| 729,643 | 5/1955 | United Kingdom |

OTHER PUBLICATIONS

Dorset, The Textile Manufacturer, 1964 (Dec.), pp. 511–516.

White, American Dyestuff Reporter, 1967 (July 31), pp. 591–597.

*Primary Examiner*—Joseph L. Schofer
*Assistant Examiner*—A. L. Clingman
*Attorney, Agent, or Firm*—Joseph G. Kolodny; Edward McC. Roberts; Prabodh I. Almaula

[57] ABSTRACT

The invention describes a process for the discontinuous aftertreatment of synthetic hydrophobic textile material, especially polyamide or polyester textile material, which is dyed preferably from an organic liquor with disperse dyestuffs containing hydroxyl and/or amino groups, with chemical fixing agents such as isocyanates, masked isocyanates, acid halides or acid anhydrides, from chlorinated aliphatic hydrocarbons, especially perchloroethylene, at temperatures above 80°C, and subsequently rinsing and drying this material on which dyeings are obtained that are fast to water, solvents, light and are also very fast to sublimation.

18 Claims, No Drawings

PROCESS FOR THE MANUFACTURE OF FAST DYEINGS ON SYNTHETIC HYDROPHOBIC TEXTILE MATERIAL

This is a continuation of application Ser. No. 380,311, filed July 18, 1973, now abandoned, which is in turn a continuation of application Ser. No. 170,951, filed Aug. 11, 1971, now abandoned.

The invention relates to a process for producing fast dyeings on synthetic hydrophobic textile material, especially polyamide or polyester material, by subjecting dyed materials to an aftertreatment with chemical fixing agents such as isocyanates or acylating agents. The invention also relates to the aftertreated, dyed textile material in the form of an industrial product.

It is known that dyeings with water-soluble substantive dyestuffs on cellulose fibres can be made wet-fast when the fibres are treated with diisocyanates during dyeing.

It is also known from French Patent No. 1.079.766 that aqueous, dyed, hydrophobic synthetic textile material is impregnated at room temperature after drying with a benzolic isocyanate solution, fixed by means of a heat treatment, and finished.

It has now been discovered that fast dyeings on synthetic hydrophobic textile material are obtained when the material which is dyed with disperse dyestuffs containing hydroxyl and/or amino groups is subjected after dyeing to a treatment with chemical fixing agents and subsequently finished.

Examples of suitable synthetic hydrophobic textile materials are: cellulose triacetate and cellulose 2½-acetate and especially polyamides, such as nylon 6, nylon 6,6 or nylon 12, and aromatic polyesters, such as those from terephthalic acid and ethylene glycol, or 1,4-dimethylolcyclohexane and copolymers from terephthalic acid and isophthalic acid and ethylene glycol.

Suitable dyestuffs are disperse dyestuffs containing hydroxyl groups and/or acylatable primary or secondary amino groups, which are able to react with the chemical fixing agents. The disperse dyestuffs, preferably contain at least one primary or secondary acylatable amino group.

Particularly preferred disperse dyestuffs are those which contain both at least one hydroxyl group and at least one primary or secondary amino group, and especially those which contain at least one aliphatic hydroxyl group.

The dyestuffs may belong to the most diverse dyestuff classes, for example the classes of perinone, quinophthalone, nitro, stilbene and methine dyestuffs, including the styryl, azamethine, polymethine and azostyryl dyestuffs. Preferably they belong to the azo series, such as the mono- or disazo series, to the anthraquinone series and the styryl series. Disperse dyestuffs of the following formulae are to be particularly mentioned.

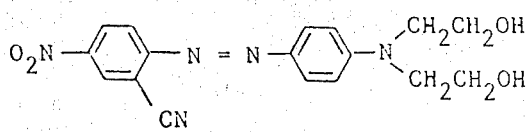

obtained by diazotising 2-cyano-4-nitroaniline and coupling with N-bis-(β-hydroxyethyl)-aniline;

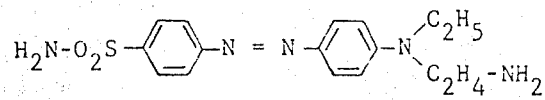

obtained by diazotising p-amidosulphonylaniline and coupling with N-ethyl-N-β-aminoethyl-aniline;

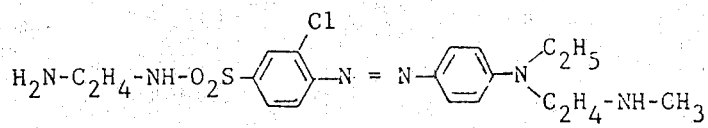

obtained by diazotising 2-chloro-4-(β-aminoethylamidosulphonyl)-aniline and coupling with N-ethyl-Nβ-methylaminoethylaniline;

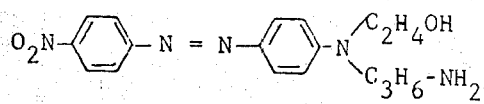

obtained by diazotising p-nitroaniline and coupling with N-β-hydroxyethyl-N-γ-aminopropylaniline;

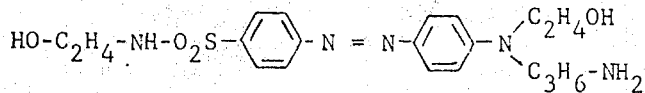

obtained by diazotising 4-(β-hydroxyethylamidosulphonyl)-aniline and coupling with N-β-hydroxyethyl-N-γ-aminopropylaniline; and the dyestuffs of the formulae:

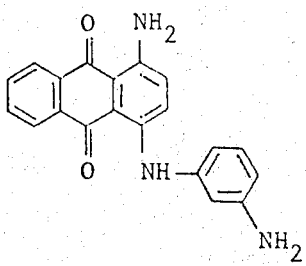
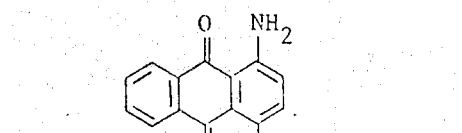

and

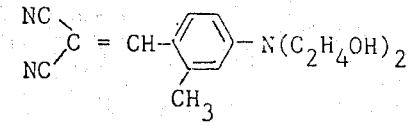

The dyeings may be produced in any desired manner, for example by conventional dyeing processes from aqueous dispersion or by dyeing from organic solvents. These dyeing processes are described, for example, by Skelly in "Chemistry and Industry" (1965), pages 1525–1533, and by Giles in "Chemistry and Industry" (1966), pages 92 to 101 and 137 to 150.

If the dyeing is carried out from an aqueous dispersion, the dyed textile material must be thoroughly dried before the additional aftertreatment with the chemical fixing agent; for example by drying it with dry hot air. If the dyeing is carried out from an organic solution, especially from perchloroethylene, the dyed textile material can be used for the aftertreatment without previously drying it, or else after centrifuging it briefly.

The textile material is subjected to the aftertreatment with the chemical fixing agents after dyeing, preferably without intermediate rinsing in the same bath, in a chlorinated aliphatic hydrocarbon having a boiling point above 100°C, especially tetrachloroethylene ("perchloroethylene"), while applying heat, primarily at temperatures above 80°C up to the boiling point of the solvent.

If necessary, it is possible to add accelerating catalysts to the treatment liquor, such as basic amines, for example tertiary organic amines such as hexahydro-N,N-dimethylaniline, tribenzylamine, N-methylpiperidine, N,N'-dimethylpiperazine, alkali or alkaline earth hydroxides, heavy metal ions, such as iron-(III), manganese-(III), vanadium-(V) or metallic soaps, such as lead oleate, lead-2-ethylhexanoate, zinc-(II)-octanoate, lead naphthenate and cobalt naphthenate, zinc-2-ethylhexanoate, as well as bismuth, antimony, and arsenic compounds, such as tributylarsine, triethylstibine oxide or phenyldichlorostibine.

It is also possible, if necessary, to add retarding substances to the treatment liquor, such as sulphur dioxide and boric acid or compounds which form acid fission products, such as carboxylic acid chlorides, butadiene sulphone and boric acid alkyl esters.

Suitable fixing agents are:

a. isocyanates, for example monovalent isocyanates, such as alkylisocyanates, for example methylisocyanate, ethylisocyanate, n-propylisocyanate, n-butylisocyanate, octylisocyanate, methylisocyanate acetate, butylisocyanate acetate, cyclohexylisocyanate, arylisocyanates, such as phenylisocyanate, p-tolylisocyanate, o-, m- and p-chlorophenylisocyanate, m- and p-nitrophenylisocyanate, 2,5-dichlorophenylisocyanate, o-and -p-methoxyphenylisocyanate, 2- naphthylisocyanate, 2-bisphenylylisocyanate; heterocyclic isocyanates, such as 2-isocyanatotetrahydropyrane, tetrahydrofurfurylisocyanate, 3-isocyanatopyridine, 2-furylisocyanate, 3-isocyanato-N-ethylcarbazole and, preferably, isocyanates of sulphur-containing heterocycles such as 2-carbomethoxy-3-isocyanatothiophene, 2-isocyanato-3-cyanothiophene, 2-isocyanato-3-carbomethoxy-4-methylthiophene, 2-isocyanato-5-methylthiophene-3-carboxylic acid amide, 2-isocyanato-3-carbomethoxy-4,5-dimethylthiophene, 2-isocyanato-3-carboethoxy-4,5-tetramethylene-thiophene, and 3-isocyanatosulpholane.

As bis- and polyvalent diisocyanates there may be cited: hexamethylenediisocyanate, N,N'-bis-(4-methyl-3-isocyanatophenyl)-urea, cyclohexane-1,4-diisocyanate, isophorone-diisocyanate, 1,2,3,4,5,6-herahydro-diphenylmethane-4,4'-diisocyanate, as well as aromatic diisocyanates such as toluene-2,4-or -2,6-diisocyanate or mixtures thereof, phenylene-1,4-diisocyanate, bis-(4-methyl-3-isocyanatophyenyl)-carbodiimide, diphenyl-4,4'-diisocyanate, diphenylmethane-4,4'-diisocyanate, diphenylmethane-3,3'-diisocyanate, diphenyldimethylmethane-4,4'-diisocyanate, stilbene-4,4'-diisocyanate, benzophenone-4,4'-diisocyanate, diphenylether- or diphenylsulphide-diisocyanate, as well as their substitution products, e.g. derivatives substituted with alkyl, alkoxy, halogen or nitro groups, such as, e.g. 3,3'-dimethyl- or 3,3'-dimethoxy- or 3,3'-dichlorodiphenylmethane-4,4'-diisocyanate. Also cited as examples are diisocyanates of the naphthalene series, such as naphthylene-1,5-diisocyanate, or heterocyclic diisocyanates, e.g. of benzofuran, or diisocyanates containing urea and uretdione groups, such as 1,3-bis-(4'-methyl-3'-isocyanatophenyl)-uretdione.

b. The use of isocyanates in the form of so-called "masked isocyanates". This class of substances, which is unitary in its chemical function, consists of chemical derivatives of isocyanates which decompose into free isocyanates only on the application of heat or in the presence of special activators. The free isocyanates then react in the desired manner with the dyestuffs, which are either on or in the fibres, and fix these chemically.

Suitable masked isocyanates are: isocyanates in the form of their composition products with alcohols, phenols, thiols, carboxylic acids, hydrocyanic acid, amines, oximes, carboxylic amides and sulphonamides, ureas, urethanes, methyleneactive compounds, bisulphites, formaldehyde and dimeric isocyanates.

Such products are described in the literature (cf. Angew. Chemie, Col. 49, pages 257 to 288 (1947), Liebigs Annalen, Vol. 562, pages 205 to 299, Ullmann, Encyclopadie der technischen Chemie, Vol. 14, page 341, 3rd Edition ). Exemplary of such masked isocyanates are:

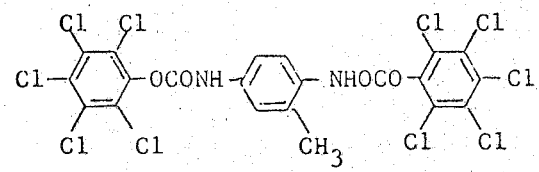

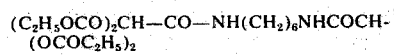

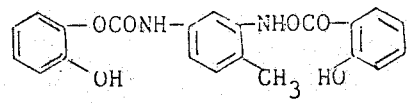

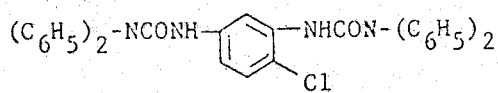

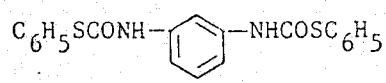

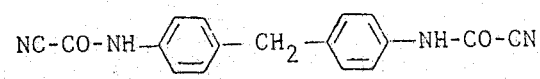

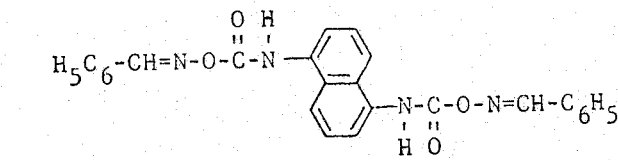

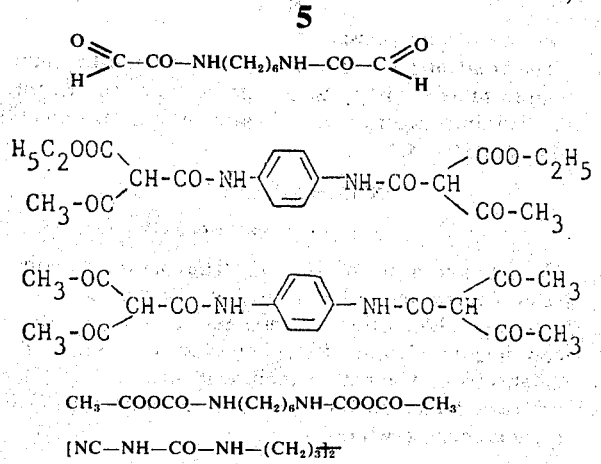

$CH_3—COOCO—NH(CH_2)_6NH—COOCO—CH_3$ $[NC—NH—CO—NH—(CH_2)_6]_2$

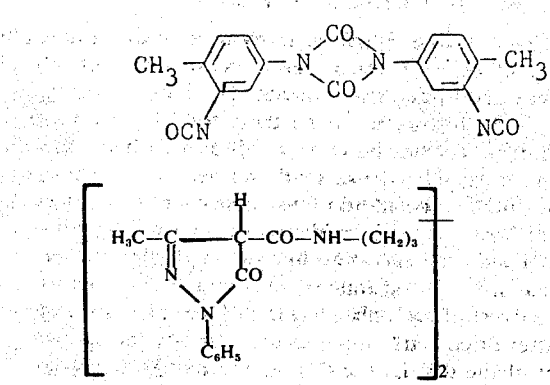

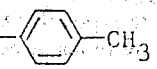

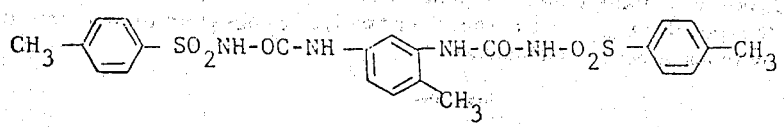

[bis-(benzoic acid-1,2-sulphimide-N-carboxylic acid)-hexamethylenediamide]

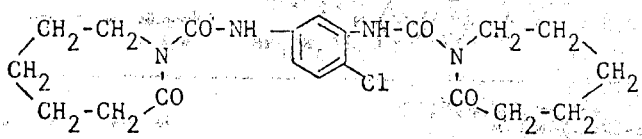

c. acylating agents, such as c₁. acid halides, for example carboxylic or sulphonic acid halides, such as the bromides, chlorides and fluorides of 1. aliphatic saturated and unsaturated monocarboxylic acids of higher molecular weight, especially those containing 8 to 18 carbon atoms, such as pelargonic acid, lauric acid, palmitic acid, stearic acid and oleic acid;
2. aliphatic dicarboxylic acids, for example oxalic acid, malonic acid, succinic acid, glutaric acid, adipic acid, pimelic acid, undecanecarboxylic acid, tetrahydrophthalic acid, hexahydrophthalic acid, endomethylene-tetrahydrophthalic acid, also diglycolic acid and thioglycolic acid; 3. polcarboxylic acids, for example aliphatic polycarboxylic acids such as tricarballylic acid;
4. aromatic monocarboxylic acids, for example benzoic acid, chlorobenzoic acid, ni robenzoic acid, cyanobenzoic acid or naphthalenecarboxylic acid and phenylbenzoic acids;
5. aromatic dicarboxylic acids, for example o-, m- or p-benzene dicarboxylic acid, naphthalene-1,5-, -1,8- or -2,6-dicarboxylic acid and 4,4'-diphenyl-dicarboxylic acid;
6. aromatic polycarboxylic acids, for example pyromellitic acid, trimesic acid and trimellitic acid;
7. heterocyclic monocarboxylic acids, for example furancarboxylic acid, thiophenecarboxylic acid, pyridinecarboxylic acid, isonicotin carboxylic acid, as well as 2,4-dichloro-pyrimidine-5-carboxylic acid;
8. heterocyclic dicarboxylic acids, for example furandicarboxylic acid, thiophenecarboxylic acid and pyridinedicarboxylic acid.

c₂. Acid anhydrides, especially cyclic aliphatic dicarboxylic acid anhydrides, such as succinic anhydride, glutaric anhydride, diglycolic anhydride, also cyclic aromatic polycarboxylic acid anhydrides, such as phthalic anhydride and pyrromellitic anhydride, or naphthalene-1,8-dicarboxylic acid anhydride, naphthalene-1,4,5,8-tetracarboxylic acid dianhydride, and tetrahydro-, hexahydro- and endomethylenetetrahydrophthalic anhydride.

Preferably, the dyed textile materials are treated in perchloroethylene with aliphatic or aromatic isocyanates, such as 1,6-hexamethylene-diisocyanate or tolyulene-diisocyanate or with masked isocyanates, such as addition products of hexamethylene-diisocyanate or toluylene-diisocyanate with malonic acid diethyl ester or pentachloropenol as well as acid chlorides, especially poly acid chlorides, such as adipic dichloride, or with polycarboxylic acid anhydrides, especially dicarboxylic acid anhydrides, for example phthalic anhydride.

All these chemical fixing agents are known and can be prepared by methods which are in themselves known. For example, the diisocyanates are obtained from the corresponding diamines by heating these with phosgene, desirably in an inert organic solvent.

The textile material is treated discontinuously with the chemical fixing agents. The textile material to be treated may be in any state of manufacture, for example in loose form, as fleece, yarn, or as knitted material, carpets or fabrics. The material, in loose form in a form achieved by mechanical means, is treated in a stationary or circulating bath, especially in suitable drum-dyeing machines, cheese dyeing machines, beam dyeing apparatus, dye-jigs, winch-vats, or similar dyeing machines, depending on the nature of the material to be treated.

The treatment can be effected in apparatus or vessels open to the outside atmosphere (optionally by reflux condenser), or in closed vessels such as pressure vessels, with or without pressure.

After the desired degree of fixing has been attained, the fixed, dyed textile material is taken from the treatment bath and cleared from it, then rinsed and dried.

The rinsing bath can be an organic solution in which an ion-free or ionogenic detergent is dissolved, or a water-insolvent emulsion which contains cleansing intensifiers, in order to remove the uncombined chemical fixing agent.

The drying and removing of the solvent which remains in the fibre can be carried out in known methods, for example in a warm, heated current of air (approximately 80° to 130°C) in the presence of steam.

It is particularly advantageous to combine the present treatment or fixing process with a dyeing process from an organic liquor, for example dyeing from perchloroethylene and carrying out the treatment with chemical fixing agents likewise from perchloroethylene with the application of heat, because it is then possible to carry out the process entirely in the absence of water.

The treatment of dyed, hydrophobic synthetic textile material using the chemical fixing agents according to the invention is distinguished above all by the fact that the fixing of the dyestuff in the dyestuff solution is effected in the fibre itself, since such fibres, for example polyester and polyamide fibres, do not contain the disperse dyestuffs in aggregate form, but as solution.

According to the fixing process according to the invention, dyestuffs which have reacted once or more than once with the chemical fixing agents yield dyeing which are particularly fast to water, solvents and light, and are also very fast to sublimation.

Compared with the French patent cited at the outset, the process according to the invention constitutes an essentially more simple and less dangerous operation with regard to the toxicity and inflammability which are a feature of the process carried out from a benzolic solution. Moreover, according to this French patent an isocyanate film is formed over the dyeing; whereas in the case of the process according to the invention the chemical fixing agent used reacts chemically in the fibre with the disperse dyestuff, and it is thus possible to obtain dyestuffs whose molecule is many times larger owing to polycondensation.

The following non-limitative examples illustrate the invention. The parts and percentages are by weight, and the temperatures are in degrees Centigrade, unless otherwise stated.

EXAMPLES 1 to 10 a. Dyeing process

At a temperature of 20°. 0.02 part of the disperse dyestuff according to Table I, Column II, is added to 32 parts of perchloroethylene and 1 part of a textile fabric according to Column III is introduced subsequently into this bath. The bath is then heated to 121° and the goods are dyed for 1 hour at this temperature. The dye liquor is then drawn off.

b. Aftertreatment process

The dyed textile fabric is introduced into a bath which contains 32 parts of perchloroethylene and 10 g/l of hexamethylene-diisocyanate. The bath is heated to 121° and aftertreatemt carried out for 1 hour at this temperature. The liquor is afterwards drawn off and the textile fabric can be subsequently washed in an organic solvent with the addition of non-ionogenic or ionogenic tensides, such as the addition product of 1 mol of nonylphenol and 9 mols of ethylene oxide, optionally in the presence of 5% of water or 5% of methanol, in order to remove dyestuff adhering to the surface. The fabric is thereafter dried for 10 minutes with hot air. upon completion of the drying, the dyeing and fixing process is also completed.

The shades of the dyeings obtained are indicated in Column IV.

Table I

| I | II | III | IV |
|---|----|-----|-----|
| 1 | HO-$C_2H_4$-NH-$O_2$S-⟨⟩-N=N-⟨⟩-N($C_2H_4$OH)($C_3H_6$-$NH_2$) | Polyamide 6,6 | orange |
| 2 | $O_2$N-⟨⟩-N=N-⟨⟩-N($C_2H_4$-OH)($C_3H_6$-$NH_2$) | do | violet |
| 3 | $H_2$N-$C_2H_4$-$O_2$S-⟨Cl⟩-N=N-⟨⟩-N($C_2H_4$-OH)($C_2H_4$-NHCH$_3$) | do | brownish red |
| 4 | $H_2$N-$O_2$S-⟨⟩-N=N-⟨⟩-N($C_2H_5$)($C_2H_4$-$NH_2$) | do | orange yellow |
| 5 | $O_2$N-⟨CN⟩-N=N-⟨CH$_3$⟩-N($C_2H_4$-OH)($C_2H_4$-OH) | do | violet |
| 6 | anthraquinone with $NH_2$ and NH-⟨⟩-$NH_2$ | do | blue |

Table I-continued

| 1 | II | III | IV |
|---|----|----|----|
| 7 | 1-amino-4-(4-aminoanilino)anthraquinone structure | do | blue |
| 8 | HO-C$_2$H$_4$-O$_2$S—⟨C$_6$H$_4$⟩—N=N—⟨C$_6$H$_4$⟩—N(C$_2$H$_4$OH)(C$_3$H$_6$NH$_2$) | Polyester | orange |
| 9 | do | Cellulose triacetate | do |
| 10 | do | Cellulose 2½-acetate | do |

EXAMPLE 11

2 Grams of the dyestuff of the formula

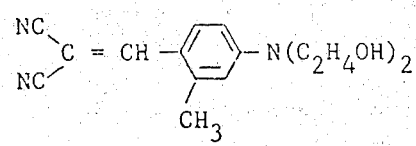

are introduced in finely disperse form into 1000 ml of tetrachloroethylene. 100 Grams of polyester material are introduced into this bath and dyed for 45 minutes after heating to 121°. The dye liquor is then drawn off and the material thoroughly rinsed with tetrachloroethylene at 80°. The material is subsequently treated for 45 minutes at 121° with a bath consisting of 1000 ml of tetrachloroethylene and 10 g of hexamethylene-diisocyanate. The fixing liquor is drawn off, the material then rinsed briefly with tetracloroethylene and then dried. A greenish yellow dyeing possessing excellent fastness properties is obtained.

Similar results are obtained if the dyestuff of the above constitution is replaced by a dyestuff according to Table II, Column II and hexamethylene-diisocyanate is replaced by the chemical fixing agents listed in Column III and the process is otherwise carried out by proceeding analogously to the method of Example 11 using the textile materials listed in Column IV, then the shades indicated in Column V are obtained. tained.

Table II

| I | II | III | IV | V |
|---|----|----|----|----|
| 12 | HOC$_2$H$_4$NHO$_2$S—⟨⟩—N=N—⟨⟩—N(C$_2$H$_4$OH)(C$_3$H$_6$NH$_2$) | [(C$_2$H$_5$OC(O))$_2$CHCNH(CH$_2$)$_3$]$_2$ | Polyamide | orange |
| 13 | H$_2$NC$_2$H$_4$NHO$_2$S—⟨Cl⟩—N=N—⟨⟩—N(C$_2$H$_4$OH)$_2$ | do | do | brownish red |
| 14 | H$_2$NO$_2$S—⟨⟩—N=N—⟨⟩—N(C$_2$H$_5$)(C$_3$H$_6$NH$_2$) | do | Polyester | orange yellow |
| 15 | (NC)$_2$C=CH—⟨CH$_3$⟩—N(C$_2$H$_4$OH)$_2$ | do | do | greenish yellow |
| 16 | do | OCN(CH$_2$)$_4$NCO | do | do |
| 17 | O$_2$N—⟨CN⟩—N=N—⟨⟩—N(C$_2$H$_4$OH)$_2$ | NaO$_3$SCONH(CH$_2$)$_6$NHCOSO$_3$Na | do | red |
| 18 | 1-hydroxy-4-(4-aminoanilino)anthraquinone | OCN—⟨CH$_3$⟩—NCO | Polyamide | reddish blue |

EXAMPLE 22

In an apparatus which permits dyeing under pressure, are made up 1500 ml of a dye bath of tetrachloroethylene containing 0.5 g of the dyestuff of the formula

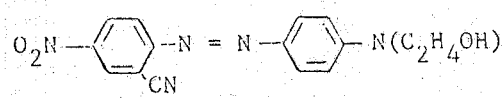

in disperse form, and 30 g of the addition product of hexamethylene-diisocyanate with pentachlorophenol. 100 Grams of textured polyester material is introduced into this liquor at 60°. The bath is heated to 121° within 20 minutes, kept at this temperature for 45 minutes, then heated within 5 minutes to 140° and kept at this temperature for 30 minutes. Then the bath is cooled and drawn off at 100° and the dyed material is rinsed at 80° with a 0.5% hexamethylphosphoric acid triamide solution in tetrachloroethylene and subsequently given a final rinse with pure tetrachloroethylene at 80°. A bluish red dyeing is obtained possessing excellent fastness properties, particularly a very good fastness to sublimation. The dyeing cannot be extracted with boiling pyridine.

Similar results are obtained if the dyestuff of the above constitution is replaced by a dyestuff according to Table III. Column II and the addition product of hexamethylenediisocyanate with pentachlorophenol is replaced by one of the chemical fixing agents listed in Column III and the process is otherwise carried out by proceeding analogously to the method of Example 22 using the textile materials listed in Column IV, then the shades indicated in Column V are obtained.

EXAMPLE 29

A dye bath consisting of 1000 ml of tetrachloroethylene with 1 g of the dyestuff according to Example 22 is prepared in an open dyeing apparatus provided with a reflux cooler. 100 Grams of textured polyester material is introduced into the bath at boiling temperature and dyed for 30 minutes at this temperature. The bath is drawn off and the material is rinsed at 80° for 10 minutes with a 0.5% hexamethylphosphoric acid triamide solution in tetrachloroethylene, then treated for 30 minutes under reflux with a solution of 10 g/l of adipic chloride in tetrachloroethylene. A red dyeing is obtained possessing excellent fastness properties, in particular very good fastness to sublimation.

Similar results are obtained if the dyestuff according to Example 29 is replaced by a dyestuff according to Table IV, Column II, and the adipic chloride is replaced by one of the chemical fixing agents listed in Column III and the process is otherwise carried out by proceeding analogously to the method of Example 29 using the textile materials listed in Column IV, when the shades indicated in Column V are obtained.

Table IV

| I | II | III | IV | V |
|---|----|-----|----|----|
| 30 | $NC\text{-}C(\text{=}CH)\text{-}C_6H_3(CH_3)\text{-}N(C_2H_4OH)_2$ (with NC,NC) | $ClC(O)\text{-}(CH_2)_4\text{-}CCl(O)$ | Polyester | greenish yellow |
| 31 | $O_2N\text{-}C_6H_3(CN)\text{-}N=N\text{-}C_6H_4\text{-}N(C_2H_4OH)_2$ | $HCCNH\text{-}C_6H_3(Cl)\text{-}NHCCH$ (with OO, OO) | do | red |
| 32 | do | $(ClCCH_2)_2CHCCl$ (with O, O) | do | do |
| 33 | $O_2N\text{-}C_6H_3(CN)\text{-}N=N\text{-}C_6H_4\text{-}N(C_2H_4OH)(CH_2CH(OH)CH_2OH)$ | $Cl\text{-}C(O)\text{-}(CH_2)_2\text{-}C(O)\text{-}Cl$ | do | do |
| 34 | $O_2N\text{-}C_6H_3(COOCH_3)\text{-}N=N\text{-}C_6H_3(CH_3)\text{-}N(C_2H_4OH)_2$ | $Cl\text{-}C(O)\text{-}(thiophene)\text{-}C(O)\text{-}Cl$ | do | do |
| 35 | do | $Cl\text{-}C(O)\text{-}C_6H_4\text{-}...Cl\text{-}C=O$ | do | do |

EXAMPLE 36

Dyeing is carried out in the same way as described in Example 29, but 100 g of polyamide fabric are used instead of 100 g of polyester. After the material has been rinsed, it is treated for 1 hour at 121° with 1000 ml of tetrachloroethylene containing 10 g/l of phthalic anhydride. The liquor is drawn off and the material is rinsed with a 5% hexamethylphosphoric acid triamide solution at 80° and dried. A red dyeing is obtained which possesses excellent fastness to washing.

Similar results are obtained if the dyestuff according to Example 36 is replaced by a dyestuff according to Table IV, Column II, and the phthalic anhydride is replaced by a chemical fixing agent listed in Column III and the process is otherwise carried out by proceeding analogously to the method of Example 36 using the textile materials listed in Column IV, when the shades indicated in Colum V are obtained.

Table V

| I | II | III | IV | V |
|---|----|-----|----|----|
| 37 | $NC\text{-}C(=CH)\text{-}C_6H_3(CH_3)\text{-}N(C_2H_4OH)_2$ (with NC,NC) | pyromellitic dianhydride | Polyamide | greenish yellow |
| 38 | $O_2N\text{-}C_6H_3(CN)\text{-}N=N\text{-}C_6H_4\text{-}N(C_2H_4OH)_2$ | cyclohexane-1,2-dicarboxylic anhydride | do | red |

Table V — Continued

| I | II | III | IV | V |
|---|---|---|---|---|
| 39 | O₂N—⟨⟩—N=N—⟨⟩—N(C₂H₄CN)(CH₂CH(OH)CH₂OH), with CN on first ring | phthalic anhydride | do | do |
| 40 | (NC)₂C=CH—⟨⟩(CH₃)—N(C₂H₅)(C₂H₄OH) | do | Polyester | greenish yellow |

What we claim is:

1. A process for dyeing synthetic hydrophobic textile material, which comprises dyeing the textile material with a disperse dyestuff containing a hydroxyl and/or a primary or secondary amino group and thereafter treating, at a temperature above 80°C, the dyed textile with a solution of a fixing agent in a chlorinated aliphatic hydrocarbon boiling above about 100°C, the fixing agent consisting essentially of an acylating agent selected from the group consisting of organic isocyanates, masked organic isocyanates, aliphatic monocarboxylic acid halides of at least 8 carbon atoms, aromatic carboxylic acid halides, heterocyclic carboxylic acid halides, aliphatic dicarboxylic acid halides, aliphatic polycarboxylic acid halides, and aliphatic and aromatic cyclic dicarboxylic acid anhydrides.

2. A process according to claim 1, wherein the chlorinated aliphatic hydrocarbon is perchloroethylene.

3. A process according to claim 1, wherein textile materials are treated which are dyed with disperse dyestuffs containing a primary or secondary amino group.

4. A process according to claim 1, wherein textile materials are treated which are dyed with disperse dyestuffs containing at least a primary or secondary amino group and at least one hydroxyl group.

5. A process according to claim 1, wherein textile materials are treated which are dyed with disperse dyestuffs containing at least one aliphatic hydroxyl group.

6. A process according to claim 1, wherein an isocyanate or masked isocyanate is used as the fixing agent.

7. A process according to claim 6, wherein the fixing agent is selected from the group consisting of OCN(CH₂)₄NCO, NaO₃SCONH(CH₂)₆NHCOSO₃Na,

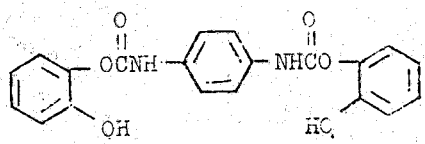
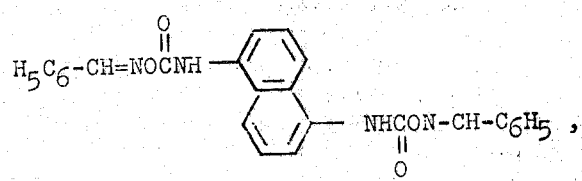
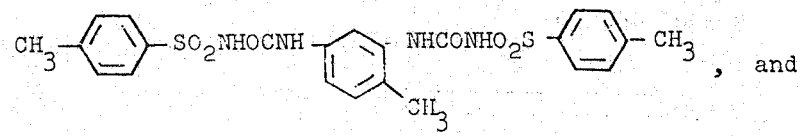

, and

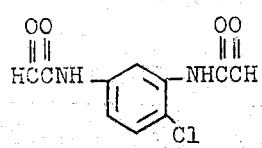

8. A process according to claim 1, wherein 1,6-hexamethylenediisocyanate or toluylene-diisocyanates are used as the fixing agent.

9. A process according to claim 1, wherein the masked isocyanate is an addition product of hexamethylene-diisocyanate or toluylene-diisocyanate with malonic acid diethyl ester or pentachlorophenol.

10. A process according to claim 1, wherein the acylating agent is a poly acid chloride.

11. A process according to claim 1, wherein the acylating agent is a dicarboxylic acid anhydride.

12. A process according to claim 1 wherein textile materials from polyester or polyamide are treated.

13. A process according to claim 1, wherein treated textile material is subsequently rinsed and dried.

14. The treated dyed textile material obtained according to claim 13.

15. A process for dyeing polyamide or polyester textile material which comprises dyeing aid material with a disperse dyestuff containing at least one hydroxyl or primary or secondary acylatable amino group and thereafter treating the dyed textile at a temperature above 80°C with a solution comprising an organic isocyanate or masked organic isocyanate in perchlorethylene.

16. A process according to claim 15 wherein the isocyanate or masked isocyanate is selected from the group consisting of hexamethylene-diisocyanate, toluylene-diisocyanate, the reaction product of hexamethylene-diisocyanate with malonic acid diethyl ester, the reaction product of hexamethylenediisocyanate with pentachlorophenol, the reaction product of toluylene-dissocyanate with malonic acid diethyl ester, the reaction product of toluylene-diisocyanate with pentachlorophenol, tetramethylene-diisocyanate,

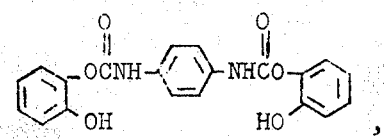 

,

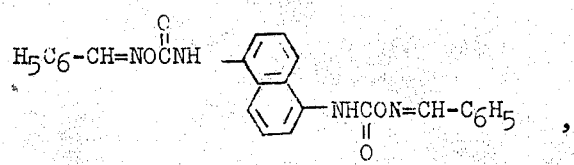

,

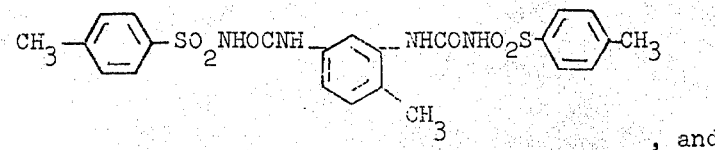

, and

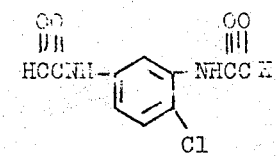

.

17. The process of claim 1, wherein the textile material is dyed with a disperse dyestuff in a chlorinated aliphatic hydrocarbon boiling above about 100°C.

18. A process according to claim 17, wherein the dyeing and the aftertreatment are carried out in the same bath without intermediate rinsing.

* * * * *

UNITED STATES PATENT OFFICE
CERTIFICATE OF CORRECTION

Patent No. 3,958,933  Dated  May 25, 1976

Inventor(s)  Gustaf Graff et al.

It is certified that error appears in the above-identified patent and that said Letters Patent are hereby corrected as shown below:

Page 1, Assignee, "Ciba-Geigy Corporation, Ardsley, N. Y." should read -- Ciba-Geigy AG, Basle, Switzerland --.

Claim 15, column 17, line 52, "duyeing aid" should read -- dyeing said --.

Signed and Sealed this

Fifth Day of October 1976

[SEAL]

Attest:

RUTH C. MASON
Attesting Officer

C. MARSHALL DANN
Commissioner of Patents and Trademarks